(12) United States Patent
Kawase et al.

(10) Patent No.: US 7,894,014 B2
(45) Date of Patent: Feb. 22, 2011

(54) BACKLIGHT DEVICE AND LIQUID CRYSTAL DISPLAY APPARATUS

(75) Inventors: Mitsuhiro Kawase, Kanagawa (JP); Toshiaki Shirakuma, Chiba (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 12/270,941

(22) Filed: Nov. 14, 2008

(65) Prior Publication Data

US 2009/0135330 A1    May 28, 2009

(30) Foreign Application Priority Data

Nov. 22, 2007    (JP)    ............... 2007-303607

(51) Int. Cl.
*G02F 1/1333* (2006.01)
*G09F 13/04* (2006.01)

(52) U.S. Cl. .................. 349/58; 349/56; 349/64; 349/112; 349/113; 362/97.2

(58) Field of Classification Search ............ 349/56, 349/58, 64, 104, 105, 106, 112, 113, 139, 349/151, 158; 362/97.2
See application file for complete search history.

(56) References Cited

U.S. PATENT DOCUMENTS

| | | | |
|---|---|---|---|
| 6,870,525 B2 * | 3/2005 | Kawabata et al. ........... 345/102 |
| 7,709,855 B2 * | 5/2010 | Ooya et al. ................... 257/99 |
| 2004/0246394 A1 * | 12/2004 | Ono et al. ...................... 349/53 |
| 2006/0279946 A1 * | 12/2006 | Park et al. ..................... 362/97 |
| 2007/0236626 A1 * | 10/2007 | Koganezawa ................ 349/61 |
| 2008/0088769 A1 * | 4/2008 | Kim et al. ..................... 349/61 |
| 2009/0097233 A1 * | 4/2009 | Ooya et al. ................. 362/97.3 |
| 2009/0135330 A1 * | 5/2009 | Kawase et al. ............... 349/58 |
| 2009/0135331 A1 * | 5/2009 | Kawase ........................ 349/58 |

FOREIGN PATENT DOCUMENTS

JP    2006-058486    3/2006

* cited by examiner

*Primary Examiner*—Brian M Healy
(74) *Attorney, Agent, or Firm*—SNR Denton US LLP (57) ABSTRACT

A backlight device that illuminates a transmissive liquid crystal panel is disclosed. The device includes: a plurality of light source substrates on which a plurality of light emitting devices irradiating illumination light are mounted; drive substrates having drive circuits for the light emitting devices and electrically connected to the light source substrates; a bottom chassis having one surface to which the plurality of light source substrates are attached; a reflector having openings corresponding to the light emitting devices and through which the light emitting devices are exposed, and reflecting the illumination light; a diffuser facing the one surface side of the reflector through a predetermined facing interval and internally diffusing the illumination light; and an optical function sheet laminate combined with the diffuser on one surface side thereof, containing a stack of a plurality of optical function sheets and guiding the illumination light to the liquid crystal panel.

8 Claims, 7 Drawing Sheets

BACKLIGHT DEVICE AND LIQUID CRYSTAL DISPLAY APPARATUS

CROSS REFERENCES TO RELATED APPLICATIONS

The present invention contains subject matter related to Japanese Patent Application JP 2007-303607 filed in the Japanese Patent Office on Nov. 22, 2007, the entire contents of which being incorporated herein by reference.

BACKGROUND OF THE INVENTION

1. Field of the Invention

The present invention relates to a backlight device that illuminates a transmissive liquid crystal panel and a liquid crystal display apparatus including the backlight device.

2. Description of the Related Art

A liquid crystal display apparatus has liquid crystal filled between two transparent substrates. The application of voltage thereto changes the direction of liquid crystal molecules and thus changes the optical transmittance, whereby the liquid crystal display apparatus can optically display a predetermined picture. Since liquid crystal itself is not a light emitter, some liquid crystal display apparatus may include a backlight device that irradiates illumination light by using light emitting diodes (which will be called LEDs hereinafter) as a light source on the back side of a liquid crystal panel, for example (refer to JP-A-2006-058486 (Patent Document 1)). In such a backlight device, a light source substrate on which LEDs are mounted is attached to one surface side of a bottom chassis, that is, inside of the bottom chassis, and drive substrates having drive circuits that drive and control the LEDs, a tuner, a protective member that protects the drive substrates, and a radiating member that radiates heat of the drive substrates, such as a radiating fin and heat sink are mounted on the other surface side of the bottom chassis, that is, outside of the bottom chassis.

SUMMARY OF THE INVENTION

It is difficult to further decrease the thickness of the backlight device since the inside of the bottom chassis has the light source substrates having LEDs and the outside has the drive substrates, tuner, protective member, radiating member and so on across the bottom chassis.

Some backlight device may have power devices that drive the LEDs, such as field effect transistors (which will be called FETs hereinafter), mounted on the drive substrates mounted on the outside of the bottom chassis. In the backlight device having such FETs, since the supply of driving current for driving the LEDs to the FETs increases the amount of heat generated by the FETs, a space part enough to radiate the generated heat is important. Therefore, it is difficult to decrease the thickness of the backlight device as described above since the drive substrates are placed on the outside of the bottom chassis.

Furthermore, it is important to extend a wiring member such as a harness to the outside of the bottom chassis through an opening or a connector of the bottom chassis in order to electrically connect the light source substrates and the drive substrates in a case where the light source substrates are mounted on the inside of the bottom chassis while the drive substrates are mounted on the outside.

For those reasons, in the backlight device, it is important for the wiring member to have longer wires, which may possibly result in noisy control signals and may increase the number of parts of the wiring member such as a harness and a connector.

Thus, it is desirable to provide a backlight device which allows the decrease in number of parts and the decrease in thickness and a liquid crystal display apparatus including the backlight device.

According to an embodiment of the invention, there is provided a backlight device that illuminates a transmissive liquid crystal panel from the back side, the backlight device including a plurality of light source substrates on which a plurality of light emitting devices that irradiate illumination light are mounted, drive substrates having drive circuits for the light emitting devices and electrically connected to the light source substrates, a bottom chassis having one surface to which the plurality of light source substrates are attached, a reflector having openings corresponding to the light emitting devices mounted on the light source substrates attached to the bottom chassis, the light emitting devices being exposed to the other surface side through the openings, the reflector reflecting the illumination light irradiated from the light emitting devices, a diffuser facing the one surface side of the reflector through a predetermined facing interval from the reflector and internally diffusing the illumination light incident from the reflector, and an optical function sheet laminate combined with the diffuser on the one surface side thereof, containing a stack of a plurality of optical function sheets and guiding the illumination light to the transmissive liquid crystal panel, wherein the drive substrates are attached to the one surface of the bottom chassis on the other surface side of the thereof.

According to another embodiment of the invention, there is provided a liquid crystal display apparatus including a transmissive liquid crystal panel and a backlight device that irradiates the transmissive liquid crystal panel from the backside.

According to the embodiments of the invention, mounting a drive substrate on the other surface side of a reflector, which is on one surface side of the bottom chassis, that is, on the circumference of a light source substrate inside of the bottom chassis can decrease the number of parts such as a wiring part that electrically connects the light source substrate and the drive substrate, a protective member that protects the drive substrate and a heat radiating part that radiates the heat of the drive substrate and can further decrease the thickness.

DESCRIPTION OF THE PREFERRED EMBODIMENTS

With reference to drawings, the backlight device and liquid crystal display apparatus to which the invention is applied will be described.

Figure 1:
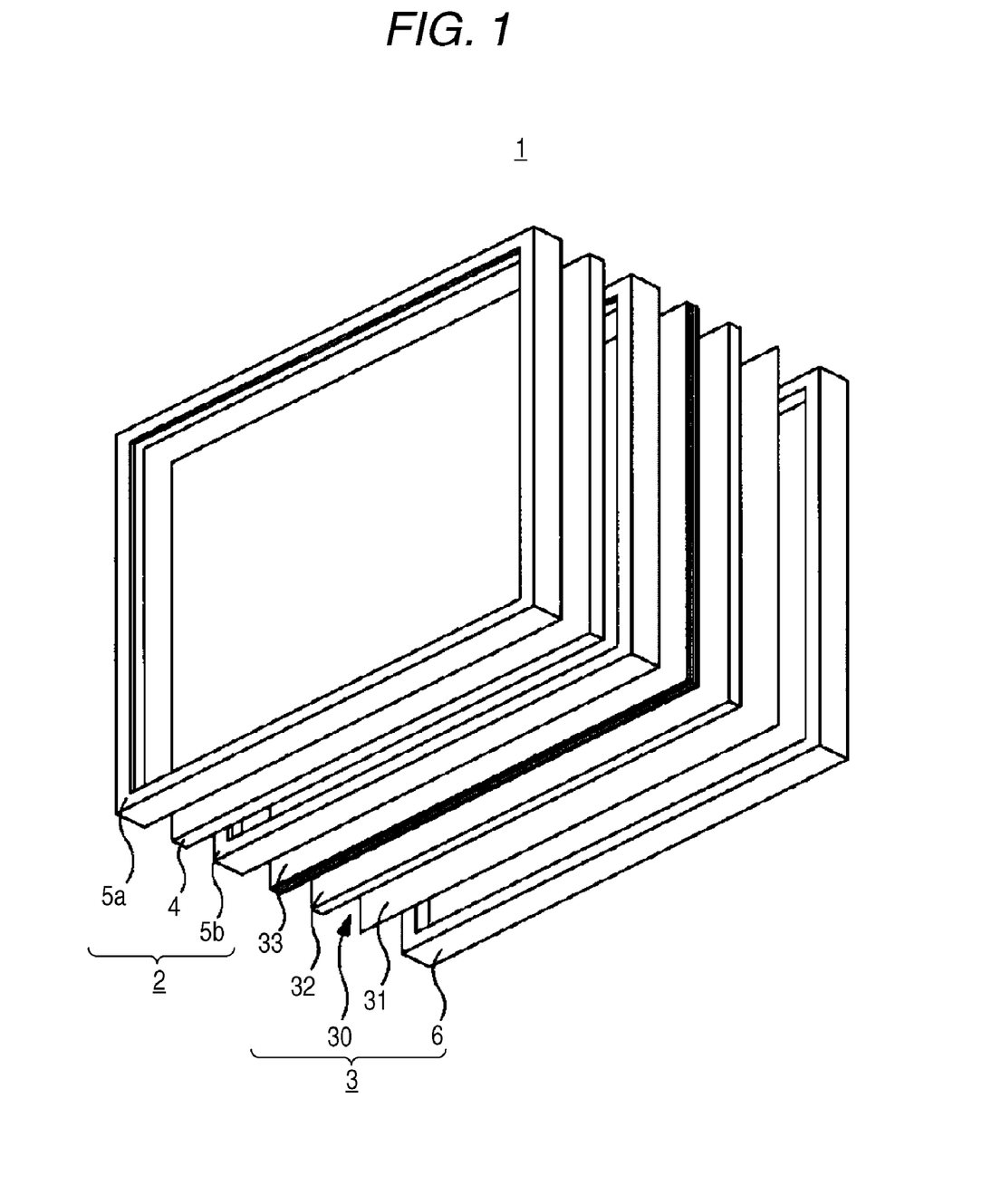
FIG. 1 is an exploded perspective view of an essential part of a transmissive liquid crystal display apparatus to which the invention is applied.
Figure 2:
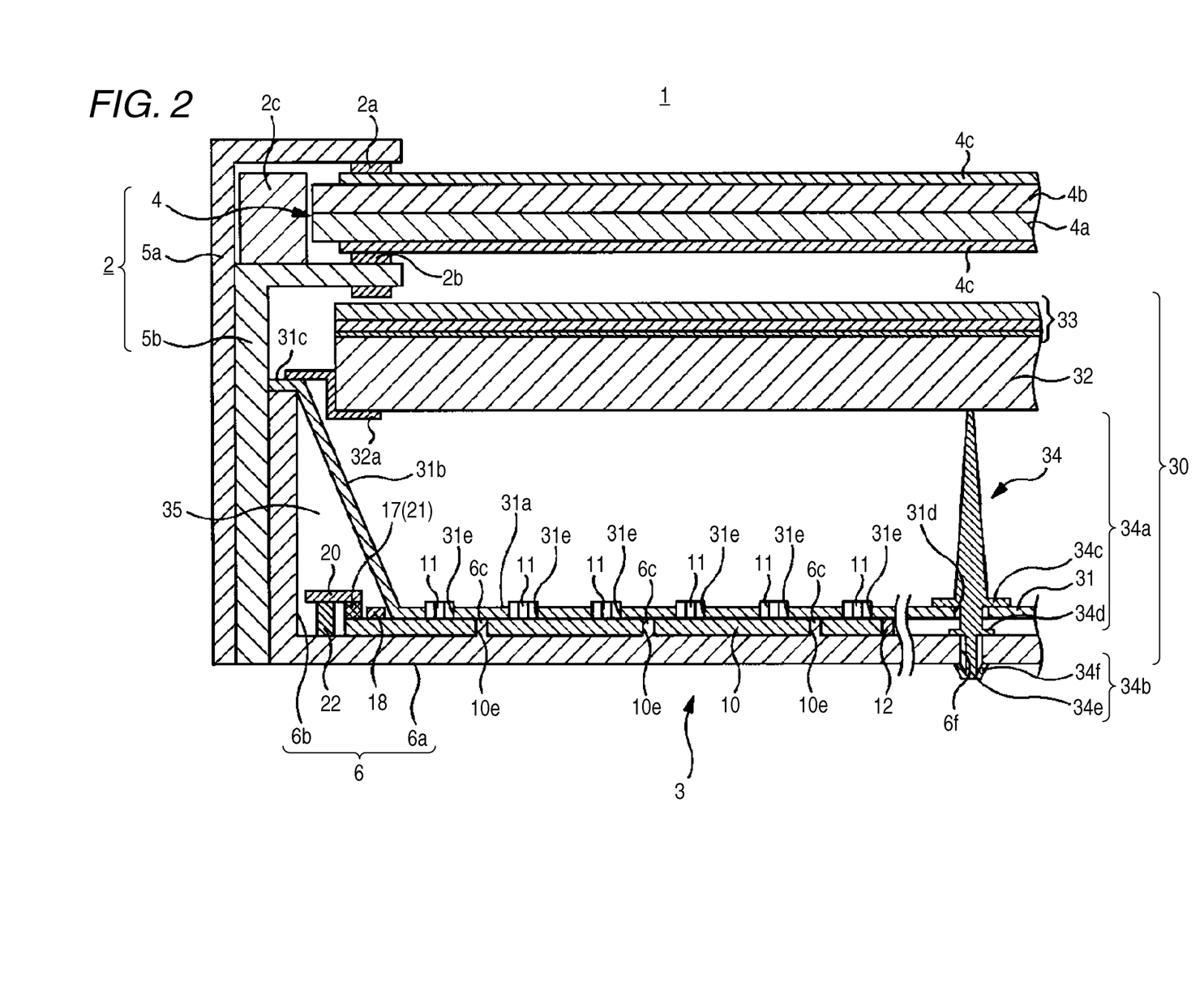
FIG. 2 is a longitudinal section view of an essential part of a transmissive liquid crystal display apparatus to which the invention is applied.

A liquid crystal display apparatus 1 to which the invention is applied may be used as a display panel for a television receiver having a large display screen. The liquid crystal display apparatus 1 includes, as shown in FIGS. 1 and 2, a liquid crystal panel unit 2 having a transmissive liquid crystal panel 4, and a backlight unit 3 to which the invention is applied. The backlight unit 3 is combined with the liquid crystal panel unit 2 on the back side thereof and irradiates illumination light to the liquid crystal panel unit 2.

The liquid crystal panel unit 2 to which the backlight unit 3 irradiates illumination light from the back side has a substantially rectangular liquid crystal panel 4 and a front frame member 5a and back frame member 5b, both of which hold the liquid crystal panel 4.

The liquid crystal panel 4 held by the front frame member 5a and back frame member 5b has liquid crystal, not shown, filled between a first glass substrate 4a and a second glass substrate 4b spaced apart through a facing interval held by spacer beads, for example, as shown in FIG. 2. The inner surface of the first glass substrate 4a may have a transparent electrode in a stripe pattern, an insulating film and an alignment film in which liquid crystal molecules are aligned in a certain direction, for example. The inner surface of the second glass substrate 4b may have a color filter for optical three primary colors, an overcoat layer that protects the color filter, a transparent electrode in a stripe pattern, and an alignment film in which liquid crystal molecules are aligned in a certain direction. Furthermore, the surfaces of the first glass substrate 4a and second glass substrate 4b have optical film layers 4c containing a polarizing film and the other containing a retardation film, respectively.

The liquid crystal panel 4 having the configuration above has liquid crystal filled between the first glass substrate 4a and second glass substrate 4b with a facing interval held therebetween by spacer beads, for example. The application of voltage to the transparent electrode thereto causes the alignment film containing polyimide to align the liquid crystal molecules in the horizontal direction about the interface, and the change in direction of the liquid crystal molecules changes their optical transmittance. Then, on the liquid crystal panel 4, the wavelength characteristic of illumination light irradiated by the backlight unit 3 is achromatized or changed to that of white through the optical film layers 4c and is changed to that of full-color through the color filter. Thus, a predetermined picture, for example, is displayed in full-color. Notably, the liquid crystal panel 4 is not limited to the configuration above.

The front frame member 5a and back frame member 5b holding the liquid crystal panel 4 have a frame shape and sandwich the outer circumferential edge of the liquid crystal panel 4 through spacers 2a and 2b and a guide member 2c to hold the liquid crystal panel 4, as shown in FIG. 2.

The liquid crystal panel unit 2 having the configuration above is combined with the backlight unit 3 at the back, and the irradiation of illumination light to the liquid crystal panel unit 2 causes the color-display of a predetermined picture, for example. The liquid crystal display apparatus 1 to which the invention is applied includes the backlight unit 3 to which the invention is applied, which will be described next, at the back, whereby the backlight unit 3 can irradiate illumination light all over the liquid crystal panel unit 2 in an even and stable manner. Therefore, the variations in brightness and color can be reduced, and the image quality can be improved.

The backlight unit 3, which is combined with the liquid crystal panel unit 2 on the back thereof and irradiates illumination light thereto, has a substantially equal external dimension to that of the back of the liquid crystal panel 2, as shown in FIG. 2, and has a bottom chassis 6 to be combined with the back frame member 5b, for example, a plurality of light source substrates 10, which are directly mounted on one surface of the bottom chassis 6 and irradiate illumination light by using a plurality of light emitting diodes (each of which will be called LED below) 11 mounted thereon as a light source, drive substrates 20 on each of which a drive circuit that drives and controls the LEDs 11 and which electrically connects to the light source substrate 10, and an optical sheet block 30, which is mounted on one surface side of the bottom chassis 6 through a predetermined facing interval against the bottom chassis 6 and performs optical processing on the illumination light irradiated from the light source substrates 10.

The bottom chassis 6, on which the light source substrates 10 are to be mounted, is formed to have high thermal conductivity by zinc-plating a metallic material having mechanical rigidity and includes, as shown in FIG. 2, a main surface part 6a having a substantially rectangular thin plate shape, which is slightly larger than the external shape of the liquid crystal panel 4, and an outer circumferential wall part 6b to be combined with the back frame member 5b at the outer circumference around the main surface part 6a.

Figure 3:
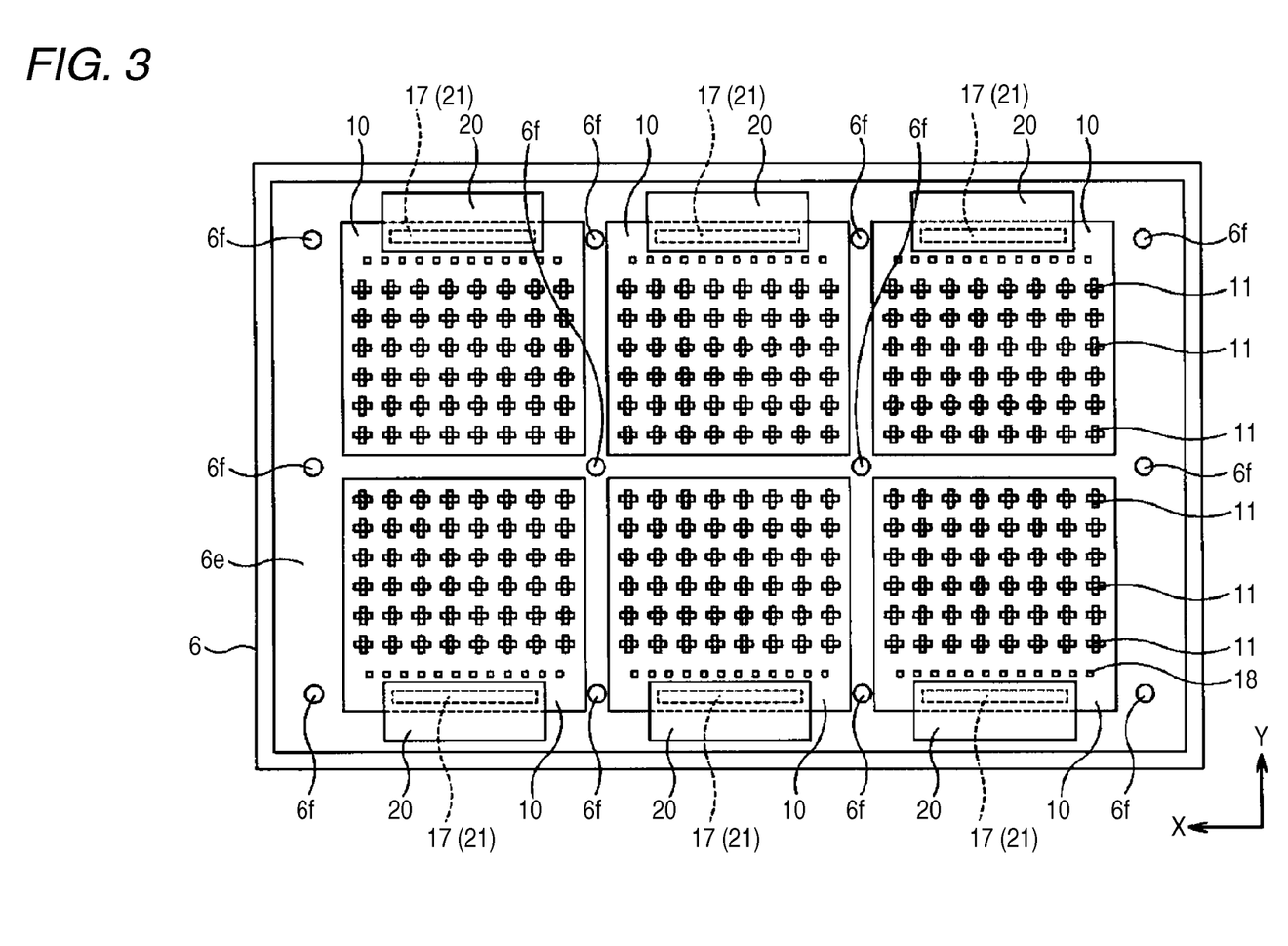
FIG. 3 is a plan view of a bottom chassis.

As shown in FIG. 3, a plurality of light source substrates 10 on each of which a plurality of LEDs 11 are mounted are directly mounted on one surface of the main surface part 6a. More specifically, a total of six light source substrates 10 are directly mounted on one surface of the main surface part 6a, including two at a predetermined interval in the longitudinal direction, that is, in the arrow-Y direction in FIG. 3 by three at predetermined intervals in the lateral direction, that is, in the arrow-X direction in FIG. 3.

Figure 4:
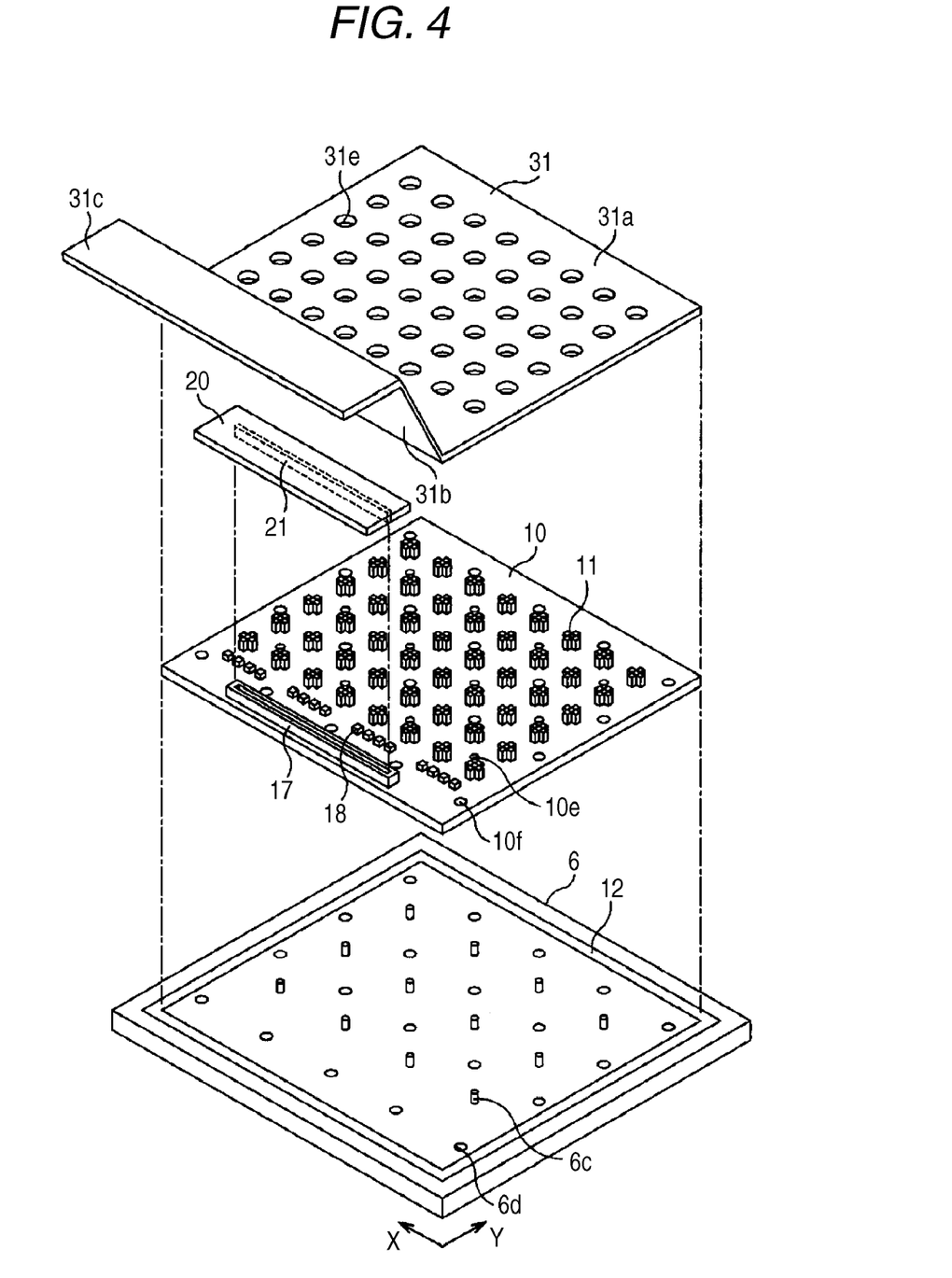
FIG. 4 is an exploded perspective view of an essential part of the bottom chassis on which the light source substrates are directly mounted.

As shown in FIG. 4, the one surface of the main surface part 6a has, for the attachment of the light source substrates 10, a plurality of positioning projections 6c which positions the light source substrates 10 at predetermined positions and a plurality of connecting holes 6d through which the light source substrates 10 positioned by the positioning projections 6c are attached by connecting members such as screws, not shown. More specifically, a total of 12 positioning projections 6c are provided for one light source substrate 10, including three at predetermined intervals in the longitudinal direction, that is, the arrow-Y direction in FIG. 4 by four at predetermined intervals in the lateral direction, that is, the arrow-X direction in FIG. 4, which means that a total of 72 positioning projections 6c are provided on the entire main surface part 6a. A total of 20 connecting holes 6d are provided for one light source substrate 10, including four at predetermined intervals in the longitudinal direction, that is, the arrow-Y direction in FIG. 4 by five at predetermined intervals in the lateral direction, that is, the arrow-X direction in FIG. 4, which means that a total of 120 connecting holes 6d are provided on the entire main surface part 6a.

The one surface of the main surface part 6a has a plurality of insertion holes 6f in an area on which the light source substrates 10 are not aligned (where the area will be called alignment part 6e hereinafter). Optical stud members 34, which will be described later, stand through the insertion holes 6f. More specifically, a total of 12 insertion holes 6f for the optical stud members 34 are placed in the alignment part 6e of the bottom chassis 6, including three at predetermined intervals in the longitudinal direction, that is, the arrow-Y direction in FIG. 3 by four at predetermined intervals in the lateral direction, that is, the arrow-X direction in FIG. 3.

As shown in FIG. 4, a double-faced adhesive tape 12 that bonds a reflector 31, which will be described later, to the bottom chassis 6 is provided on the alignment part 6e. The double-faced adhesive tape 12 may be a thermal-conductive adhesive tape with high thermal conductivity and is provided all over the entire circumference of the light source substrates 10 on the alignment part 6e.

The numbers and alignment positions of the positioning projections 6c, connecting holes 6d and insertion holes 6f may differ in accordance with the size of the liquid crystal panel 4, for example, and can be changed properly.

Figure 5:
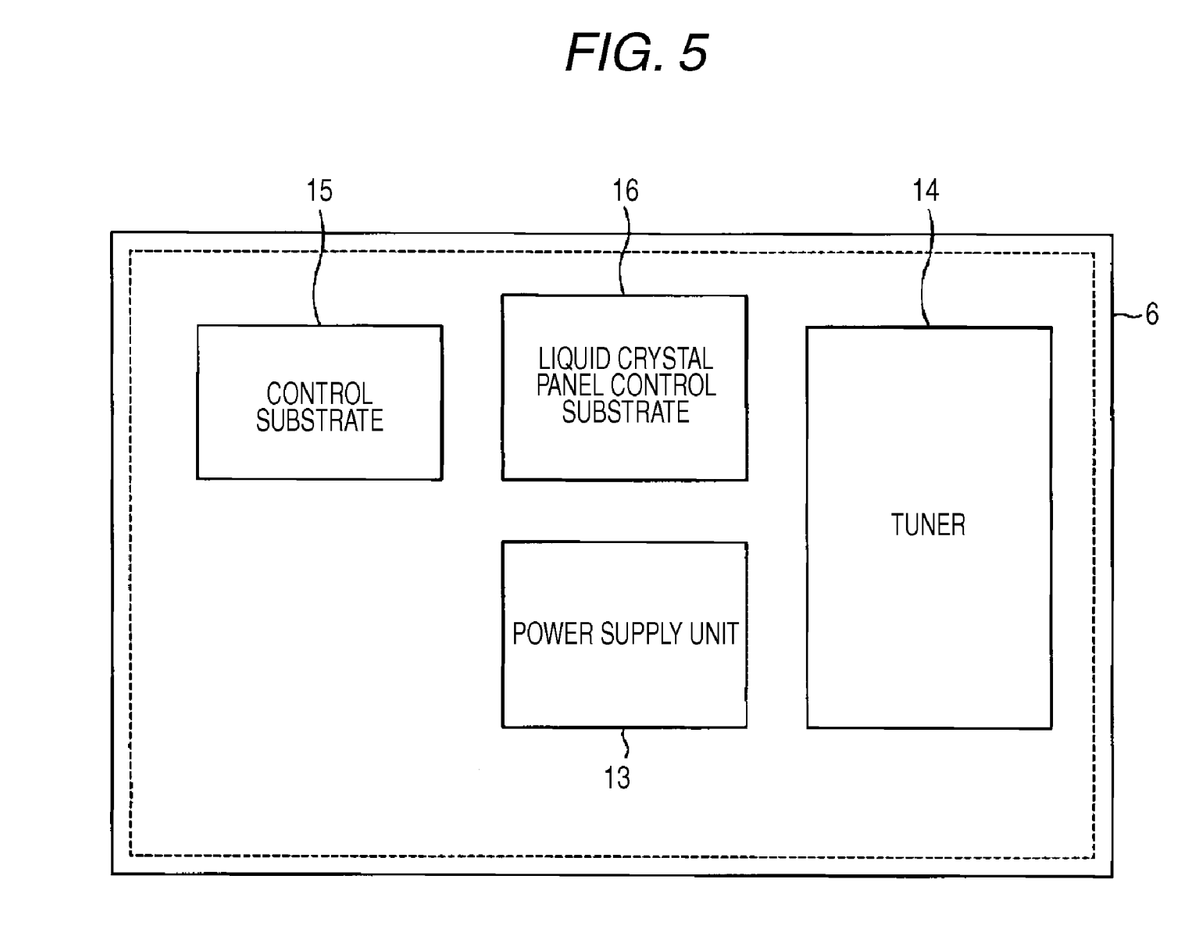
FIG. 5 is a back view of the bottom chassis.

As shown in FIG. 5, a power supply unit 13, a tuner 14, a control substrate 15 and a liquid crystal panel control substrate 16 are mounted on the other surface of the main surface part 6a. The power supply unit 13 supplies driving current to the LEDs 11, for example. The tuner 14 creates display data of a predetermined picture, for example, to be displayed on the liquid crystal panel 4. The control substrate 15 supplies a control signal based on the display data created by the tuner 14 and controls the whole. The liquid crystal panel control substrate 16 controls the liquid crystal panel 4 based on the control signal supplied from the control substrate 15.

The power supply unit 13 may have a switching regulator, for example, and supplies alternate current supplied through a power supply terminal such as an external power supply outlet for commercial power supply, for example, to circuits.

The tuner 14 creates display data of a predetermined picture, for example, selected by a user, for example, from a display signal received by a receiving antenna, not shown, for example. Then, the tuner 14 supplies the created predetermined display data to the control substrate 15.

The control substrate 15 has a control circuit including one or a plurality of electronic parts such as an integrated circuit chip. On the basis of the display data supplied from the tuner 14, the control circuit supplies a control signal for driving and controlling the LEDs 11 to the drive substrate 20 and supplies a control signal for driving and controlling the liquid crystal panel 4 to the liquid crystal panel control substrate 16.

The liquid crystal panel control substrate 16 to which a control signal is supplied from the control substrate 15 has a control circuit having one or a plurality of electronic parts such as an integrated circuit chip. On the basis of the control signal supplied from the control substrate 15, the control circuit applies voltage to the transparent electrode in a stripe shape on the first and second glass substrates 4a and 4b to change the direction of liquid crystal molecules filled between the first glass substrate 4a and the second glass substrate 4b and thus change the optical transmittance of the liquid crystal panel 4, which causes the liquid crystal panel 4 to display a predetermined picture.

An attachment part 31c of the reflector 31, which will be described later, is mounted on the outer circumferential wall part 6b of the bottom chassis 6 around the main surface part 6a as described above. The attachment part 31c is to be bonded to the one surface with the double-faced adhesive tape 12, as shown in FIG. 2.

Figure 6:
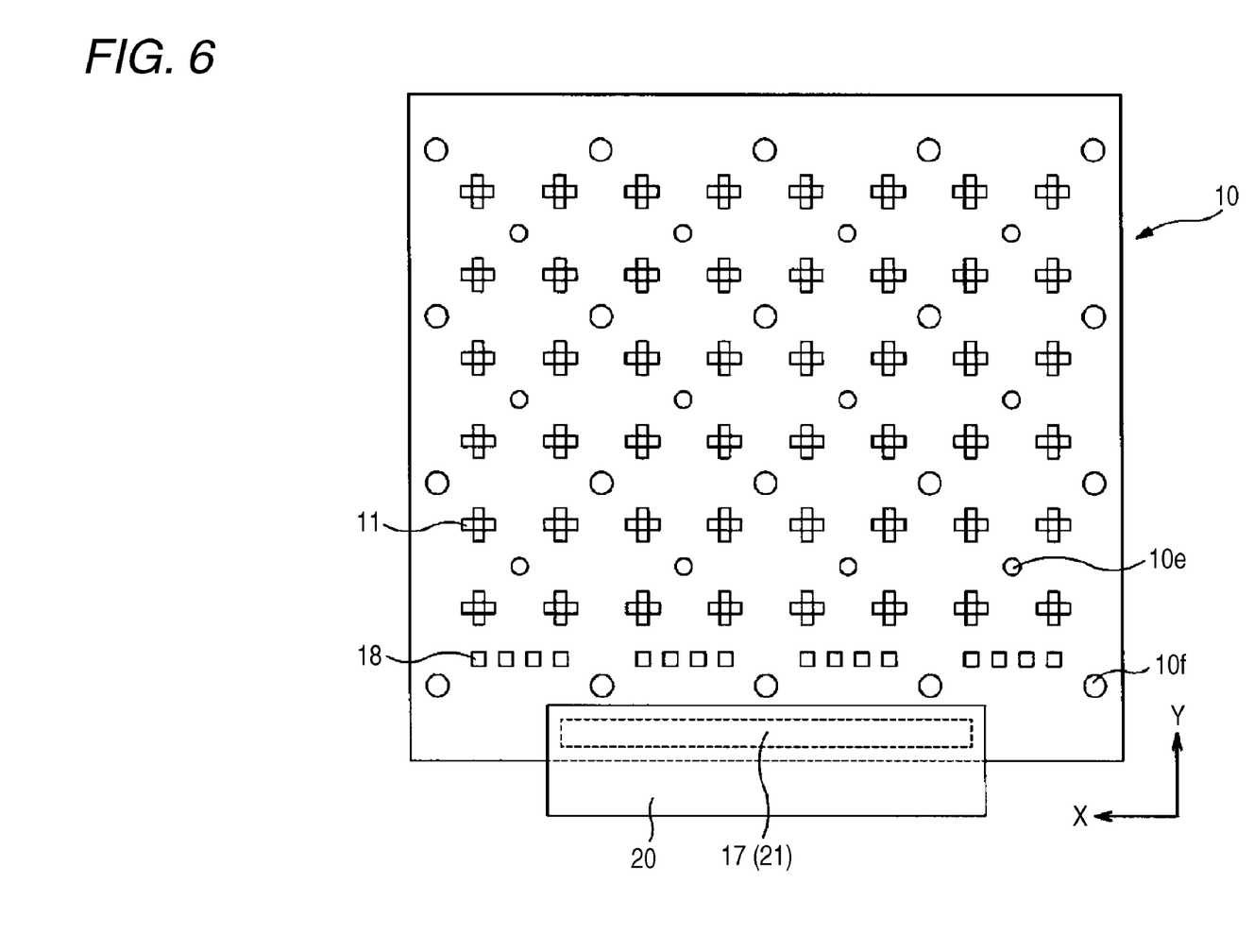
FIG. 6 is a plan view of a light source substrate on which a drive substrate is mounted.
Figure 7:
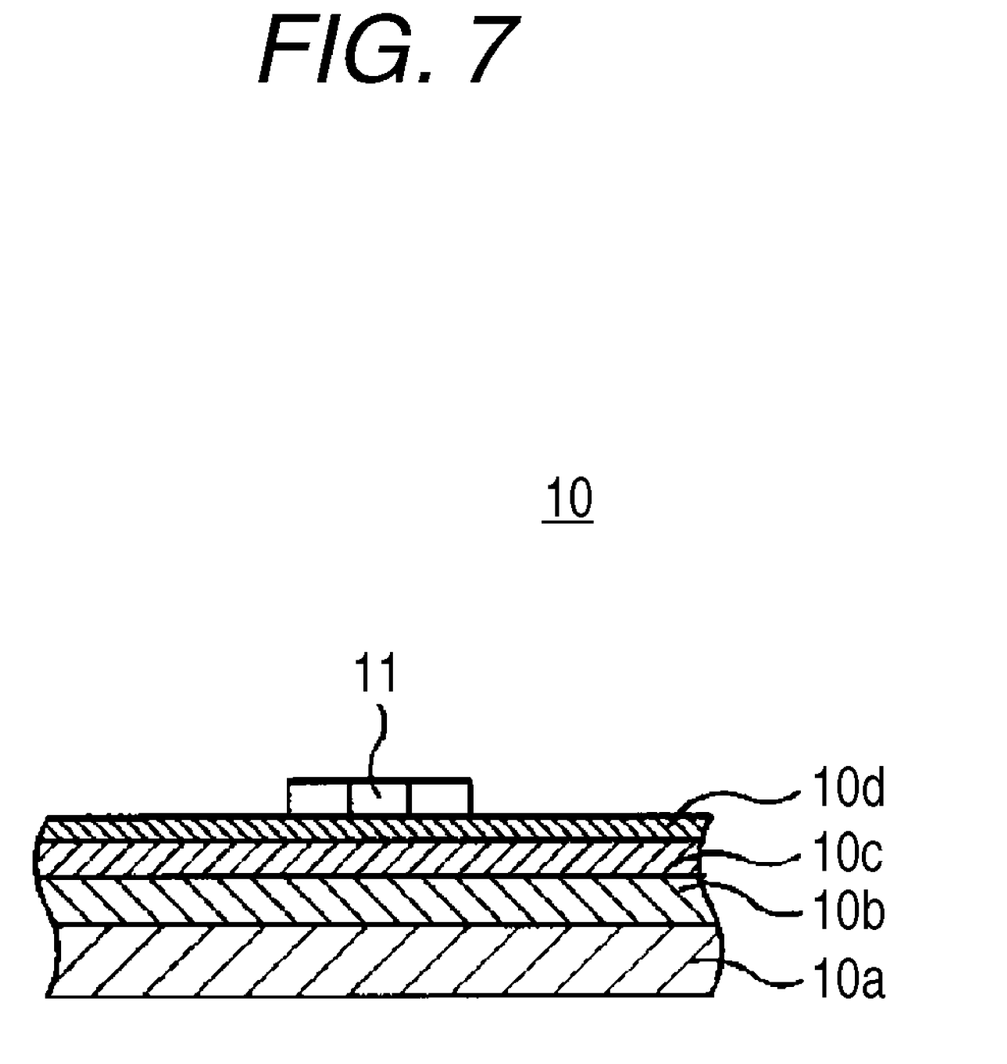
FIG. 7 is a longitudinal section view of an essential part of a light source substrate.

The plurality of light source substrates 10 which are mounted on the one surface of the main surface part 6a and on which the plurality of LEDs 11 that irradiate illumination light are mounted have an electrically conductive layer, as shown in FIG. 6, on the surface and are metal core substrates with high thermal conductivity, which are formed of an aluminum material, for example, and have a substantially rectangular thin plate shape. More specifically, as shown in FIG. 7, each of the light source substrates 10 has an insulating layer 10b approximately 0.15 mm thick on a surface, which will be called one surface, of a base 10a approximately 0.2 mm thick of aluminum foil. An electrically conductive layer 10c having a wiring pattern of copper foil is provided on one surface of the insulating layer 10b. A soldering resist layer 10d covers a wiring pattern on the one surface of the electrically conductive layer 10c and protects the wiring pattern. Each of the light source substrates 10 has a thickness of approximately 0.5 mm as a whole.

As shown in FIG. 6, the one surface of each of the light source substrates 10 has a plurality of LEDs 11, a connector 17 that electrically connects the light source substrate 10 and the drive substrate 20 and a plurality of power devices that drive the LEDs 11, such as field effect transistors (which will be called FETs, hereinafter) 18. The power devices are not limited to the FETs 18 but may be bipolar transistors, for example.

More specifically, each of combinations of LEDs 11 includes one red LED, one blue LED and two green LEDs, and one light source substrate 10 has a total of 48 LEDs 11 including six at predetermined intervals in the longitudinal direction, that is, in the arrow-Y direction in FIG. 6 by eight at predetermined intervals in the lateral direction, that is, the arrow-X direction in FIG. 6.

The connector 17 is a wiring member that wires the corresponding light source substrate 10 and drive substrate 20 removably without using a wiring member such as a harness and has a socket to which a connecting member 21 having a plug is inserted. The connecting member 21 is a wiring member mounted on the drive substrate 20. The connector 17 is mounted near one outer circumferential edge of the corresponding light source substrate 10 so that the drive substrate 20 can be placed on the other surface side of the reflector 31 when the light source substrate 10 is attached to the main surface part 6a. Then, the insertion of the connecting member 21 on the drive substrate 20 to the connector 17 electrically connects the corresponding light source substrate 10 and drive substrate 20. Thus, driving current is supplied from the power supply unit 13 to the LEDs 11 through the drive substrate 20, and a control signal that drives and controls the LEDs 11 is supplied from the control substrate 15 to the FETs 18.

The FETs 18 switch the ON- or OFF-state of a block of the LEDs 11, which is a unit of light emission, based on a control signal supplied from the control substrate 15 to the drive substrate 20. Each block of the LEDs 11 includes a total of four LEDs 11, 11, 11 and 11 including two in the longitudinal direction (or Y-direction) and two in the lateral direction (or X-direction). The FETs 18 supply driving current to the four LEDs 11, 11, 11 and 11 to control the amount of emitted light.

Notably, it is important here that the light source substrates 10 have flexibility because of the thin light source substrates 10 as a whole each including the thin base 10a. The thicknesses of the base 10a, insulating layer 10b, electrically conductive layer 10c and soldering resist layer 10d are not limited to those described above and can be changed properly. The light source substrates 10 are not limited to those of an aluminum material but may be formed of other metallic material. The light source substrates 10 may not have flexibility with a sufficient thickness. Each of the combinations of the LEDs 11 may include a combination of a total of three LEDs of a red LED, a blue LED and a green LED. Furthermore, the number and alignment positions of the LEDs 11 to be mounted on the light source substrate 10 may differ in accordance with the size of the liquid crystal panel 4, for example, and can be changed properly.

In addition, each of the light source substrates 10 has positioning holes 10e and through holes 10f for positioning on the bottom chassis 6, as shown in FIG. 6. The positioning holes 10e correspond to the alignment positions of the positioning projections 6c on the one surface of the bottom chassis 6. Each of the light source substrates 10 has a total of 12 positioning holes 10e including three at predetermined intervals in the longitudinal direction, that is, in the arrow-Y direction in FIG. 6 by four at predetermined intervals in the lateral direction, that is, in the arrow-X direction in FIG. 6. The through holes 10f correspond to the alignment positions of the connecting holes 6d on the one surface of the bottom chassis 6. Each of the light source substrates 10 has a total of 20 through holes 10f including four at predetermined intervals in the longitudinal direction, that is, in the arrow-Y direction in FIG. 6 by five at predetermined intervals in the lateral direction, that is, in the arrow-X direction in FIG. 6. The numbers and alignment positions of the positioning holes 10e and through holes 10f can be changed properly since it is important here that the light source substrates 10 can be attached to one surface of the bottom chassis 6.

Furthermore, as shown in FIG. 3, a total of six light source substrates 10 are directly mounted on the one surface of the main surface part 6a, including two at a predetermined interval in the longitudinal direction, that is, in the arrow-Y direction in FIG. 3 by three at predetermined intervals in the lateral direction, that is, in the arrow-X direction in FIG. 3. In this case, each of the light source substrates 10 is mounted with the connector 17 directing to the outer circumferential side. More specifically, each of the light source substrates 10 is mounted with the long side of the corresponding drive substrate 20 in a substantially rectangular shape directing to the arrow-X direction in FIG. 3. Thus, the drive substrate 20 can be placed in the circumference of the light source substrate 10.

The number and alignment positions of the light source substrates 10 to be mounted on one surface of the bottom chassis 6 may differ in accordance with the size of the liquid crystal panel 4, for example, and can be changed properly. It is important here that each of the light source substrates 10 may be mounted with the connector 17 directing to the outer circumferential side. Therefore, the long sides of the drive substrates 20 on the light source substrates 10, which are mounted at both ends in the lateral direction, that is, in the arrow-X direction in FIG. 3 may direct to the arrow-Y direction in FIG. 3. Furthermore, the attachment of the light source substrates 10 is not limited to the attachment on the one surface of the bottom chassis 6 with connecting members such as screws, but the light source substrates 10 may be bonded to the one surface of the bottom chassis 6 with an adhesive.

In each of the light source substrates 10 in the configuration above, each of the FETs 18 switches the ON- or OFF-state of a block of the LEDs 11, which is a unit of light emission, on the basis of a control signal supplied from the corresponding drive substrate 20 through the corresponding connector 17. Each block of the LEDs 11 includes a total of four LEDs 11, 11, 11 and 11 including two in the longitudinal direction (or Y-direction) and two in the lateral direction (or X-direction). The FETs 18 supply driving current to the four LEDs 11, 11, 11 and 11 to control the amount of emitted light. Thus, illumination light can be irradiated within the light source substrate 10 with the brightness differentiated among blocks.

In each of the light source substrates 10, the mounted FETs 18 are provided at the final stage of the drive circuit and generate heat since driving current for driving the LEDs 11 are supplied thereto. However, since each of the light source substrates 10 is a metal core substrate with high thermal conductivity of an aluminum material and is directly mounted on the bottom chassis 6 with high thermal conductivity. Therefore, the heat generated by the FETs 18 can be radiated to the bottom chassis 6 efficiently.

Each of the light source substrates 10 having the configuration above is a metal core substrate of an aluminum material, for example, and is as thin as approximately 0.5 mm thick as a whole including a thickness of the base 10a of approximately 0.2 mm. Therefore, the light source substrate 10 has high flexibility and can be bent for intimate contact with the bottom chassis 6 in accordance with the form of the bottom chassis 6 even in a case where the one surface of the bottom chassis 6 has projections and depressions. As a result, the heat from the LEDs 11 and FETs 18 can be radiated to the bottom chassis 6 efficiently.

Each of the drive substrates 20 to be electrically connected to the corresponding light source substrate 10 through the connecting member 21 is a glass epoxy substrate having one or a plurality of electronic parts such as an integrated circuit chip on one surface and further has a drive circuit that drives and controls the LEDs 11 and has a substantially rectangular and thin plate shape. The other surface of the drive substrate 20 has the connecting member 21 having a plug to be inserted into a socket of the connector 17 of the light source substrate 10, as shown in FIG. 4. Then, the insertion of the connecting member 21 to the connector 17 of the light source substrate 10 can attach the drive substrate 20 to the circumference of the light source substrate 10 and can electrically connect the drive substrate 20 to the light source substrate 10. Thus, the drive substrate 20 is mounted on the other surface side of the reflector 31, which is one surface side of the bottom chassis 6, that is, inside of the bottom chassis 6.

As shown in FIG. 2, the other surface of the drive substrate 20 has one or a plurality of supporting members 22 of a metallic material with mechanical rigidity and thermal conductivity. The supporting member or members 22 support the drive substrate 20 and transfers the heat generated from the drive substrate 20 to the bottom chassis 6.

Furthermore, the drive substrate 20 electrically connects to the power supply unit 13 and control substrate 15 mounted on the other surface of the main surface part 6a through a wiring member such as a harness, which extends through an opening, not shown, of the bottom chassis 6.

Each of the drive substrates 20 having the configuration above receives the supply of driving current that drives the LEDs 11 from the power supply unit 13 since it electrically connects to the power supply unit 13. The drive substrate 20 further receives the supply of a control signal from the control substrate 15 since it electrically connects to the control substrate 15. Since the drive substrate 20 electrically connects to the light source substrate 10 through the connecting member 21, the drive substrate 20 drives and controls the FETs 18 mounted on the light source substrate 10 through the connecting member 21 on the basis of the control signal supplied from the control substrate 15 to switch the ON- or OFF-state of a block of the LEDs 11, which is a unit of light emission, where each block of the LEDs 11 includes a total of four LEDs 11, 11, 11 and 11 including two in the longitudinal direction (or Y-direction) and two in the lateral direction (or X-direction). The FETs 18 supply driving current to the four LEDs 11, 11, 11 and 11 to control the amount of emitted light.

Thus, illumination light can be irradiated within the light source substrate 10 with the brightness differentiated among blocks.

Since each of the drive substrates 20 is mounted on the other surface side of the reflector 31, which is the one surface side of the bottom chassis 6, that is, inside of the bottom chassis 6 and in the circumference of the corresponding light source substrate 10, the thickness of the backlight unit 3 can be further decreased, and the number of parts such as a protective member that protects the drive substrate 20 and a radiating part that radiates the heat of the drive substrate 20 can be decreased.

Since each of the drive substrates 20 is mounted on the other surface side of the reflector 31, which is the one surface side of the bottom chassis 6, that is, inside of the bottom chassis 6 and in the circumference of the corresponding light source substrate 10 and the tuner 14 is mounted on the outside of the bottom chassis 6 across the bottom chassis 6 of a metallic material, the bottom chassis 6 can function as a shield. Thus, the discharge of the unnecessary radiation of current can be suppressed, and the electromagnetic wave resistant characteristics can be improved. Furthermore, the mutual interference between the drive substrate 20 and the tuner 14, the power supply unit 13, control substrate 15 or liquid crystal panel control substrate 16 can be prevented.

Since each of the drive substrates 20 electrically connects to the corresponding light source substrate 10 through the connecting member 21, the electric connection with the light source substrate can be mounted through a shorter wiring member. Therefore, the amount of noise can be reduced. Furthermore, the discharge of the unnecessary radiation of current can be suppressed, and the electromagnetic wave resistant characteristics can be improved.

It is not limited that the insertion of the connecting member 21 to the connector 17 of the corresponding light source substrate 10 can mount the drive substrate 20 to the light source substrate 20 and can electrically connect the drive substrate 20 to the light source substrate 10. The drive substrate 20 may be directly mounted to the one surface of the main surface part 6a with a connecting member such as a screw and may electrically connect to the light source substrate 10 through an FPC (or Flexible Printed wiring Cable) or an FFC (or Flexible Flat Cable), for example.

The optical sheet block 30 that performs optical processing on illumination light irradiated from the light source substrate 10 is faced against the back side of the liquid crystal panel 4, as shown in FIG. 2. The optical sheet block 30 has the reflector 31, a diffuser 32, an optical function sheet laminate 33 and the optical stud member 34. The reflector 31 is faced against the bottom chassis 6 having one surface on which a plurality of light source substrates 10 are mounted through a predetermined facing interval against the one surface and reflects illumination light irradiated from the LEDs 11 toward the one surface. The diffuser 32 is faced against one surface side of the reflector 31 through a predetermined facing interval and internally diffuses the incident illumination light. The optical function sheet laminate 33 is combined with the diffuser 32 on the one surface side thereof and includes a stack of a plurality of optical function sheets. The optical stud member 34 defines the facing interval between the bottom chassis 6 and the reflector 31 and the facing interval between the reflector 31 and the diffuser 32.

The reflector 31 facing the one surface of the bottom chassis 6 through a predetermined facing interval is formed into a substantially rectangular box shape, which is gradually widen to the opening side, as shown in FIG. 2, by a transparent or milky-white resin having high reflectivity and mechanical rigidity, such as a polycarbonate resin. The surface is coated with a reflective film. More specifically, the reflector 31 has a flat main surface part 31a in a substantially equal size to that of the main surface part 6a of the bottom chassis 6, an outer circumferential part 31c that is continuous from the main surface part 31a and is gradually and outwardly widen from the main surface part 31a to the opening and an attachment part 31c projecting from the end of the opening side of the outer circumferential part 31b to the outside substantially in parallel with the main surface part 31a. The attachment part 31c is attached to the outer circumferential wall part 6b of the bottom chassis 6.

The main surface part 31a of the reflector 31 has reflector through holes 31d corresponding to the alignment positions of the insertion holes 6f of the bottom chassis 6 to which the optical stud members 34 are inserted. More specifically, the main surface part 31a of the reflector 31 has a total of 12 reflector through holes 31d including three at predetermined intervals in the longitudinal direction by four at predetermined intervals in the lateral direction, which correspond to the alignment positions of the insertion holes 6f. Furthermore, the main surface part 31a of the reflector 31 has openings 31e facing the LEDs 11 mounted on the plurality of light source substrates 10 on the one surface of the bottom chassis 6, and the LEDs 11 are exposed through the openings 31e. Thus, the reflector 31 reflects the illumination light irradiated by the LEDs 11 exposed through the openings 31e to one surface side, that is, the diffuser 32 side.

As shown in FIG. 2, the reflector 31 is bonded to the one surface of the bottom chassis 6 with the double-faced adhesive tape 12 on the alignment part 6e of the bottom chassis 6. In this case, a space part 35 is provided between the other surfaces of the outer circumferential part 31b and attachment part 31c of the reflector 31 and the one surface of the bottom chassis 6. The drive substrates 20 mounted on the light source substrates 10 through the connecting members 21 are placed within the space part 35.

Thus, the attachment of the drive substrates 20 in the circumference of the light source substrates 10 within the space part 35, that is, inside of the bottom chassis 6 and can further decrease the thickness of the backlight unit 3 and the number of parts including the protective members that protect the drive substrates 20 and/or the heat radiating parts that radiate the heat of the drive substrates 20.

Since the drive substrates 20 are mounted in the circumference of the light source substrates 10 within the space part 35, that is, inside of the bottom chassis 6 and the tuner 14 is mounted on the outside of the bottom chassis 6 across the bottom chassis 6 of a metallic material, the bottom chassis 6 can function as a shield. Therefore, the discharge of the unnecessary radiation of current can be suppressed, and the electromagnetic wave resistant characteristics can be improved, which can prevent the mutual interference therebetween.

Since the drive substrates 20 electrically connect to the light source substrates 10 through the connecting members 21 within the space part 35 and can be electrically connected to the light source substrates 10 through short wiring members, the noise can be reduced. Furthermore, the discharge of the unnecessary radiation of current can be suppressed, and the electromagnetic wave resistant characteristics can be improved.

The reflector 31 is not limited to one formed by a resin material, for example. It is important here that the reflector 31 reflects illumination light, and the reflector 31 may be one formed by coating a reflective film over a surface of a metallic material having mechanical rigidity such as an aluminum material.

The diffuser 32 facing the one surface of the reflector 31 through a predetermined facing interval against the reflector 31 is formed into a substantially rectangular and thin plate, as shown in FIG. 2, by a transparent or milky-white resin having conductivity and mechanical rigidity, such as an acrylic resin and a polycarbonate resin and in a substantially same shape as that of the reflector 31. The diffuser 32 internally refracts and reflects illumination light incident from the other surface side for diffusion, whereby the illumination light is guided to the optical functional sheet laminate 33 combined with the one surface evenly and entirely. The diffuser 32 is mounted on the outer circumferential wall part 6b of the bottom chassis 6 with the outer circumferential edge held by a bracket member 32a.

The optical function sheet laminate 33 combined with the diffuser 32 on the one surface thereof has a substantially rectangular shape, which is substantially equal shape to that of the diffuser 32, as shown in FIG. 2, and has a stack of a plurality of optical function sheets having optical functions. The plurality of optical function sheets may include a polarizing film having a function of decomposing illumination light irradiated from the LEDs 11 mounted on the light source substrates 10 to the liquid crystal panel 4 into orthogonal polarized components, a retardation film having a function of compensating phase shifts among optical waves for wider viewing angles and prevention of coloration and a diffusion film having a function of diffusing illumination light. The optical function sheet laminate 33 is not limited to the optical function sheet described above but may be upper and lower two diffusion sheets sandwiching a brightness enhancement film for brightness enhancement, a retardation film and/or a prism sheet, for example.

Each of the optical stud members 34 that define the mutual facing intervals among the optical sheets as described above is formed by a transparent or milky-white resin having high reflectivity, conductivity and mechanical rigidity, such as a polycarbonate resin, as shown in FIG. 2. Each of the optical stud members 34 has a body 34a and an attachment part 34b. The body 34a has the pointed end abutted against the other surface of the diffuser 32 and defines the facing interval between the diffuser 32 and the bottom chassis 6. The attachment part 34b is provided continuously toward the base end of the body 34a.

The body 34a defining the facing interval between the diffuser 32 and the bottom chassis 6 has a conical pointed end with the diameter gradually decreasing toward the tip, and a reflector defining part 34c projects from the base end of the conical shape. The reflector defining part 34c has a larger diameter than that of the reflector through hole 31d. The reflector defining part 34c is abutted against the one surface of the reflector 31. Furthermore, in the body 34a, a bottom chassis defining part 34d projects from the base end. The bottom chassis defining part 34d has a larger diameter than that of the insertion hole 6f of the bottom chassis 6. The bottom chassis defining part 34d is abutted against the one surface of the bottom chassis 6.

The attachment part 34b provided continuously at the base end of the body 34a integrally has a spindle 34e to be inserted to the insertion hole 6f of the bottom chassis 6. A support medium 34f projects from the outer circumference of the base end of the spindle 34e. The support medium 34f has a larger diameter than that of the insertion hole 6f at the tip end, and the tip surface is supported by the circumference on the other surface side of the insertion hole 6f. The support medium 34f has elasticity, and when the tip end of a larger diameter than that of the insertion hole 6f is pushed radially, the diameter becomes smaller than that of the insertion hole 6f temporarily. Thus, the support medium 34f can be detached from the bottom chassis 6.

Now, a method for assembling the backlight unit 3 will be described.

A total of six light source substrates 10, including two at a predetermined interval in the longitudinal direction, that is, in the arrow-Y direction in FIG. 3 by three at predetermined intervals in the lateral direction, that is, in the arrow-X direction in FIG. 3, are positioned on the one surface of the bottom chassis 6 with the positioning projections 6c of the bottom chassis 6 through the positioning holes 10e and are directly mounted thereon by screwing into the connecting holes 6d with connecting members such as screws through the through holes 10f. Each of the light source substrates 10 has a total of 48 LEDs 11 in a matrix of 6 rows by 8 columns where each of the LEDs 11 includes a combination of a total of four of one red LED, one blue LED and two green LEDs. In this case, each of the light source substrates 10 is mounted with the connector 17 directing to the outer circumferential side. More specifically, each of the light source substrates 10 is mounted with the long sides of the drive substrates 20 having a substantially rectangular shape directing to the arrow-X direction in FIG. 3.

Then, the drive substrate 20 is mounted in the circumference of and can be electrically connected to the corresponding light source substrate 10 by inserting the connecting member 21, which is mounted on the other surface, into the connector 17 of the light source substrate 10. The connecting member 21 has a plug to be inserted into a socket of the connector 17 of the light source substrate 10. In this case, the other surface of each of the drive substrates 20 has the supporting member or members 22 of a metallic material with mechanical rigidity and thermal conductivity. The drive substrates 20 are supported by the supporting members 22 on the one surface, and the heat generated from the drive substrates 20 are transferred to the bottom chassis 6. The drive substrates 20 are electrically connected to the control substrate 15 already mounted on the other surface of the main surface part 6a through a wiring member such as a harness, which extends through an opening, not shown, of the bottom chassis 6. The double-faced adhesive tape 12 that bonds the reflector 31 is provided across all circumferences of the light source substrates 10 on the alignment part 6e, which is an area where the light source substrates 10, which are placed on one surface of the bottom chassis 6, are not placed.

Next, the reflector 31 has the openings 31e through which the LEDs 11 are exposed and has the other surface bonded to the one surface of the bottom chassis 6 with the double-faced adhesive tape 12 on the alignment part 6e of the bottom chassis 6 with the reflector through holes 31d and the insertion holes 6f faced against each other. The reflector 31 is attached to the outer circumferential wall part 6b of the bottom chassis 6 at the attachment part 31c with a connecting member such as a screw or an adhesive, for example. In this case, the space part 35 is provided between the other surfaces of the outer circumferential part 31b and attachment part 31c of the reflector 31 and the one surface of the bottom chassis 6. The drive substrates 20 mounted on the light source substrates 10 through the connecting members 21 are placed within the space part 35.

Next, the optical stud members 34 are pushed into the insertion holes 6f with the attachment part 34b through the reflector through holes 31d of the reflector 31 from the one surface side of the bottom chassis 6. When each of the attachment parts 34b of the optical stud members 34 passes through the corresponding insertion hole 6f, the diameter of the support medium 34f becomes smaller than that of the insertion hole 6f. After it passes through the insertion hole 6f, the diameter returns to a larger diameter than that of the insertion hole 6f because of the elasticity. Thus, the tip surface of the support medium 34f can be supported by the circumference on the other surface side of the insertion hole 6f. In this case, each of the optical stud members 34 is attached to the bottom chassis 6 with the tip surface of the support medium 34f supported by the circumference of the other surface side of the insertion hole 6f of the bottom chassis 6 and with the bottom chassis defining part 34d abutted against the one surface of the bottom chassis 6.

Next, the diffuser 32 already in combination with the optical function sheet laminate 33 on one surface is attached to the outer circumferential wall part 6b of the bottom chassis 6 by using the bracket member 32a with the other surface abutted against the tips of the optical stud members 34. In this case, the optical stud members 34 define the facing intervals between the diffuser 32 and the reflector 31 and the reflector 31 and the bottom chassis 6 with the tips of the optical stud members 34 in contact with and abutted against the other surface of the diffuser 32 at dots or narrower areas and with the reflector defining part 34c abutted against the one surface of the reflector 31. Thus, the parallelism among the main surfaces of the facing optical sheets can be maintained with high precision across the entire surfaces.

In the backlight unit 3 having the configuration above, the FETs 18 are mounted on the light source substrates 10 of a metallic material with high thermal conductivity, and the light source substrates 10 are directly mounted on the bottom chassis 6 with high thermal conductivity. Thus, the heat generated by the FETs 18 can be radiated to the bottom chassis 6 through the light source substrates 10, and the drive substrates 20 can be mounted within the space part 35 within the bottom chassis 6 between the other surfaces of the outer circumferential part 31b and attachment part 31c of the reflector 31 and the one surface of the bottom chassis 6, that is, inside of the bottom chassis 6 and in the circumference of the light source substrates 10. This can eliminate the necessity for a protective member that protects the drive substrates 20 and/or a radiating member that radiates the heat of the drive substrates 20 and allows the electric connection between the light source substrates 10 and the drive substrates 20 through short wiring members. Therefore, the thickness of the backlight unit 3 can be further decreased, and the number of parts therein can be reduced.

In the backlight unit 3, the light source substrates 10 and the drive substrates 20 can be electrically connected through short wiring members. Therefore, the noise can be reduced. Furthermore, the discharge of the unnecessary radiation of current can be suppressed, and the electromagnetic wave resistant characteristics can be improved.

In the backlight unit 3, since the drive substrates 20 are mounted within the space part 35 on the other surface side of the reflector 31, which is the one surface side of the bottom chassis 6, that is, inside of the bottom chassis 6 and in the circumference of the light source substrates 10 and the tuner 14 is mounted on the outside of the bottom chassis 6 across the bottom chassis 6 of a metallic material, the bottom chassis can function as a shield. Therefore, the discharge of the unnecessary radiation of current can be suppressed, and the electromagnetic wave resistant characteristics can be improved, which can prevent the mutual interference therebetween.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight device that illuminates a transmissive liquid crystal panel from the back side, the backlight device comprising:
    a plurality of light source substrates on which a plurality of light emitting devices that irradiate illumination light are mounted;
    drive substrates having drive circuits for the light emitting devices and electrically connected to the light source substrates;
    a bottom chassis having one surface to which the plurality of light source substrates are attached;
    a reflector having openings corresponding to the light emitting devices mounted on the light source substrates attached to the bottom chassis, the light emitting devices being exposed to one surface side through the openings, the reflector reflecting the illumination light irradiated from the light emitting devices;
    a diffuser facing the one surface side of the reflector through a predetermined facing interval from the reflector and internally diffusing the illumination light incident from the reflector; and
    an optical function sheet laminate combined with the diffuser on one surface side thereof, containing a stack of a plurality of optical function sheets and guiding the illumination light to the transmissive liquid crystal panel,
    wherein the drive substrates are attached to the one surface of the bottom chassis on the other surface side of the reflector.

2. The backlight device according to claim 1, wherein power devices are mounted on the light source substrates.

3. The backlight device according to claim 2, wherein the light emitting devices are driven in blocks each including the plurality of light emitting devices by the drive substrates.

4. The backlight device according to claim 1, wherein a tuner is mounted on the other surface side of the bottom chassis.

5. A liquid crystal display apparatus comprising:
    a transmissive liquid crystal panel; and
    a backlight device that illuminates a transmissive liquid crystal panel from the back side, the backlight device having
    a plurality of light source substrates on which a plurality of light emitting devices that irradiate illumination light are mounted;
    drive substrates having drive circuits for the light emitting devices and electrically connected to the light source substrates;
    a bottom chassis having one surface to which the plurality of light source substrates are attached;
    a reflector having openings corresponding to the light emitting devices mounted on the light source substrates attached to the bottom chassis, the light emitting devices being exposed to the other surface side through the openings, the reflector reflecting the illumination light irradiated from the light emitting devices;
    a diffuser facing the one surface side of the reflector through a predetermined facing interval from the reflector and internally diffusing the illumination light incident from the reflector; and
    an optical function sheet laminate combined with the diffuser on one surface side of, containing a stack of a plurality of optical function sheets and guiding the illumination light to the transmissive liquid crystal panel, wherein the drive substrates are attached to the one surface of the bottom chassis on the other surface side of the reflector.

6. The liquid crystal display apparatus according to claim 5, wherein power devices are mounted on the light source substrates.

7. The liquid crystal display apparatus according to claim 6, wherein the light emitting devices are driven in blocks each including the plurality of light emitting devices by the drive substrates.

8. The liquid crystal display apparatus according to claim 5, wherein a tuner is mounted on the other surface side of the bottom chassis.

* * * * *

UNITED STATES PATENT AND TRADEMARK OFFICE
CERTIFICATE OF CORRECTION

| | | |
|---|---|---|
| PATENT NO. | : 7,894,014 B2 | Page 1 of 1 |
| APPLICATION NO. | : 12/270941 | |
| DATED | : February 22, 2011 | |
| INVENTOR(S) | : Mitsuhiro Kawase and Toshiaki Shirakuma | |

It is certified that error appears in the above-identified patent and that said Letters Patent is hereby corrected as shown below:

In the Claims:

Column 14, lines 59-60

"to the other surface side through the openings"

should be

-- to one surface side through the openings --

Column 14, lines 66-67

"an optical function sheet laminate combined with the diffuser on one surface side of"

should be

-- an optical function sheet laminate combined with the diffuser on one surface side thereof --

Signed and Sealed this
Fifth Day of April, 2016

Michelle K. Lee
*Director of the United States Patent and Trademark Office*